Oct. 20, 1925.

R. J. BROWNBACK

WINDSHIELD WIPER

Filed June 10, 1924

Inventor

Russell J. Brownback

By Alexander & Dowell

Attorneys

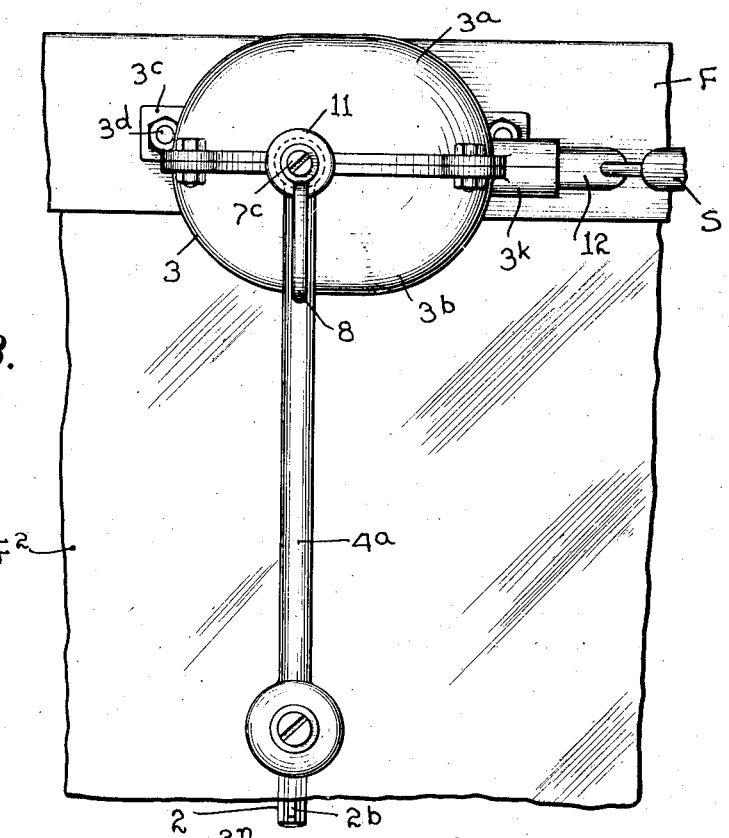
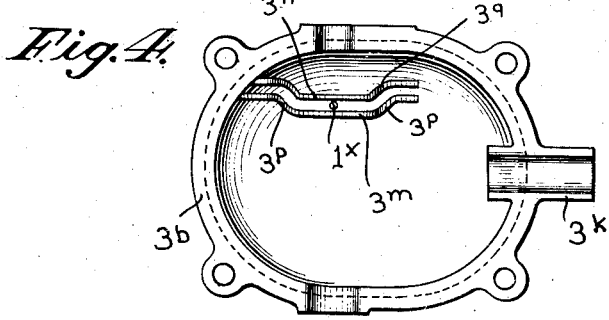
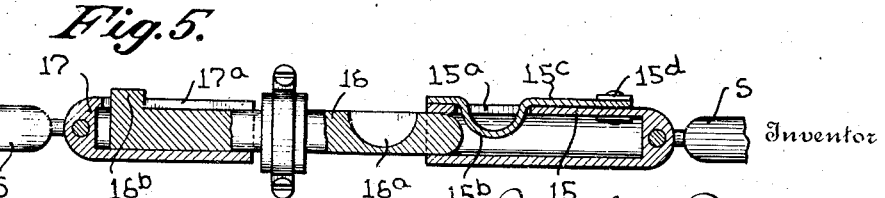

Patented Oct. 20, 1925.

1,558,340

UNITED STATES PATENT OFFICE.

RUSSELL JAMES BROWNBACK, OF NORRISTOWN, PENNSYLVANIA.

WINDSHIELD WIPER.

Application filed June 10, 1924. Serial No. 718,168.

*To all whom it may concern:*

Be it known that I, RUSSELL J. BROWNBACK, a citizen of the United States, residing at Norristown, in the county of Montgomery and State of Pennsylvania, have invented certain new and useful Improvements in Windshield Wipers; and I hereby declare that the following is a full, clear, and exact description thereof, reference being had to the accompanying drawings, which form part of this specification.

This invention is an improvement in wind-shield wipers for removing mist, sleet, water, snow, and the like, from the wind-shields of automobiles, trolley or steam cars or locomotives, boats, and the like, and the principal object thereof is to provide a wind-shield wiper which may either be operated positively from a solid or flexible shaft, such as the shaft of a speedometer, taximeter, drive shaft, or other rotating part of the vehicle or its motor or other mechanism, or said wiper may be manually operated by means of a hand crank engaging the wiper shaft.

A further object of the invention, is to provide a novel wind-shield wiper having an oscillatory wiper blade, means being provided for automatically shifting the wiper blade out of contact with the wind-shield at the end of each wiping stroke, to prevent binding of the wiper blade against said wind-shield while the direction of travel of said blade is being reversed, thereby reducing friction during such reversal of movement, and resulting in less power being required to operate the wiper.

A still further object of the invention is to provide a novel link connection between the wiper shaft and the power driving shaft, whereby the rotatory motion of the power driving shaft will be positively converted into oscillatory motion of the wiper shaft.

Other minor objects of the invention will be hereinafter set forth.

I will explain the invention with reference to the accompanying drawings which illustrate one practical embodiment thereof to enable others to adopt and use the same, and will summarize in the claims the novel features of construction, and novel combinations of parts, for which protection is desired.

In said drawings:

Fig. 3 is a rear elevation of the wiper.

Fig. 4 is a plan view of the lower half of the wiper casing showing the parallel guides.

Fig. 5 is a longitudinal section through the clutch.

Figure 1:
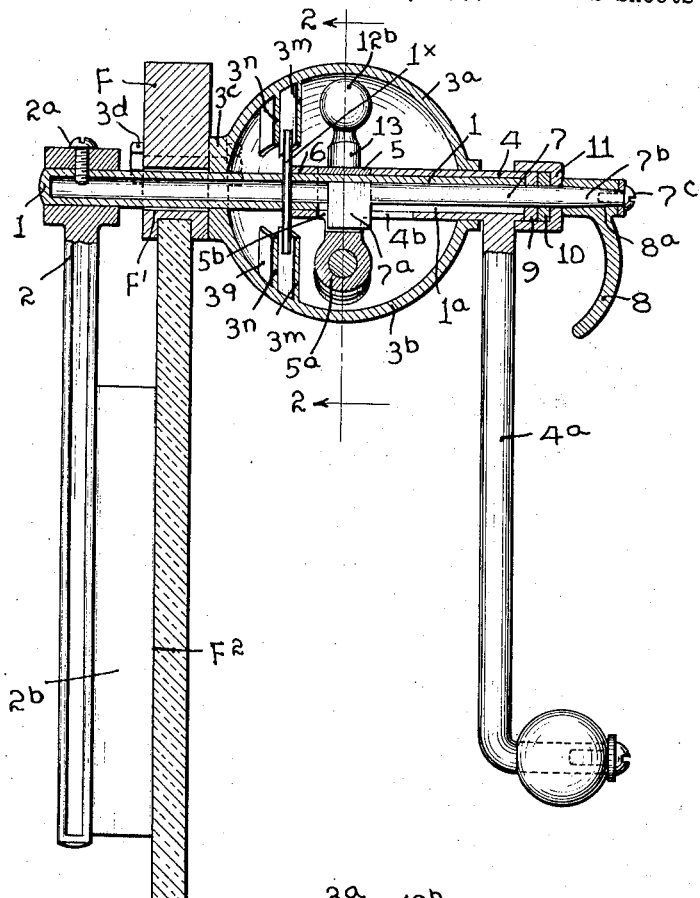
Fig. 1 is a longitudinal section through my novel wind-shield wiper, showing same applied to a conventional wind-shield.

As shown in the drawings, my novel wind-shield wiper comprises preferably a tubular shaft 1 passing through a hole F' in the wind-shield frame F, the outer end of said shaft 1 carrying the wiper arm 2, which is attached thereto preferably by means of a set screw $2^a$, arm 2 carrying the usual rubber or fabric cleaner $2^b$, which contacts with the exposed face $F^2$ of the wind-shield, in the usual manner.

Shaft 1 passes diametrically through a casing 3, which houses the working parts of the wiper mechanism as will be hereinafter described. The opposite end of tubular shaft 1, is provided with a longitudinal slot $1^a$, extending from said end to a point slightly in front of the transverse axis of the casing 3, said slot $1^a$ being adapted to receive a longitudinally adjustable key $7^a$ hereinafter referred to.

Figure 2:
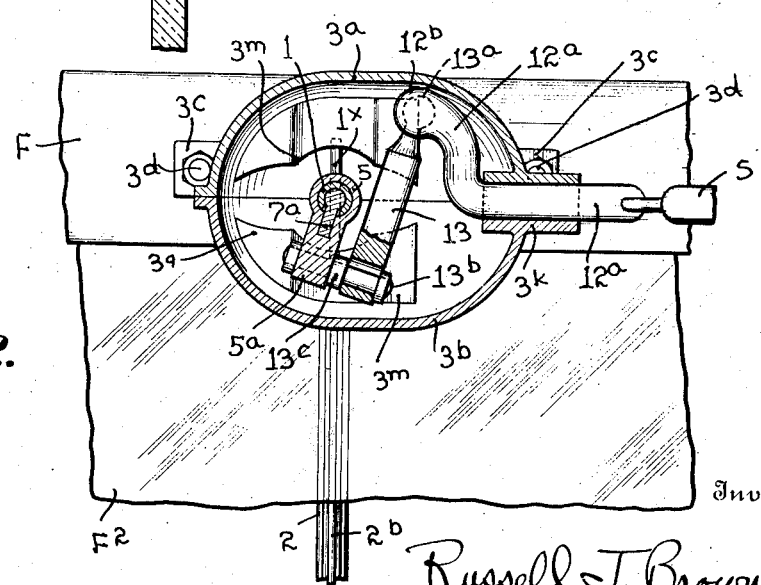
Fig. 2 is a section on the line 2—2, Fig. 1.

Casing 3, is preferably substantially globular in form, and is formed of two symmetrical halves $3^a$, $3^b$, meeting in the horizontal plane of the axis of shaft 1, as shown in Figs. 2 and 3, said halves being preferably detachably connected at their meeting edges in any desired manner. One of said halves $3^a$ is provided with extensions $3^c$ provided with perforations for the passage of the screws or bolts $3^d$, which attach the casing to the frame F of the wind-shield.

Around the shaft 1 is a sleeve 4, making a sliding fit with said shaft, said sleeve extending from the inner end of the shaft to a point slightly to the rear of the transverse axis of the casing 3. A hand crank $4^a$ is attached to the sleeve 4 exterior to the casing 3, by which hand crank the said sleeve 4 may be rocked to oscillate the shaft 1, when the key 7ª is shifted to lock sleeve 4 to the shaft 1, as will be hereinafter explained. The end of sleeve 4 within the casing 3 is provided with a longitudinal slot 4ᵇ for the reception of said clutch key 7ª.

Halves 3ª, 3ᵇ, of the casing are provided respectively with parallel guide-ways 3ᵐ, 3ⁿ, disposed transversely to the shaft 1, the guide-ways of part 3ª being disposed above, and the guideways of part 3ᵇ, being disposed below the shaft 1, as shown in Figs. 1 and 2. Guide ways 3ᵐ, 3ⁿ, are respectively provided with symmetrically disposed off-set portions 3ᵖ, 3ᵠ, on both sides of shaft 1 and equidistant therefrom, which off-sets are disposed slightly nearer the wind-shield glass F² than the main portions of said guide-ways. Transfixing the shaft 1 is a vertically disposed pin 1ˣ, the ends of which pin are adapted to engage the parallel guide ways above and below said shaft 1, so that when shaft 1 is oscillated, the pin 1ˣ will slide in the main portions of the guide ways but when the pin engages the off-set portions 3ᵖ, 3ᵠ, the shaft will be shifted slightly away from the windshield F, and thereby disengage the wiper 2ᵇ from the wind-shield at the end of each wiping stroke of said wiper and during the reversal of the direction of motion thereof.

Loosely mounted upon the shaft 1, and disposed at the transverse axis of the casing 3, is a collar 5, having an arm or crank portion 5ª depending therefrom, for the purpose hereinafter described, and said collar 5 is further provided with a longitudinal slot 5ᵇ for the reception of the key 7ª hereinafter described. Collar 5 abuts against the inner end of sleeve 4, and between the opposite end of collar 5 and the pin 1ˣ is a spacing washer 6, for the purpose of maintaining the collar 5, at the transverse axis of the casing 3, and for the purpose of holding said collar 5 against the adjacent end of collar 4.

Extending into the hollow shaft 1, from the rear end thereof is a rod 7, on the inner end of which is the flattened key 7ª, which extends through slot 1ª in said shaft 1, said rod 7 and key 7ª being adjustable in said slot longitudinally of the shaft. The outer end of rod 7 is tapered, as at 7ᵇ, and is adapted to receive the correspondingly tapered bore 8ª of a trigger or finger 8, which trigger is retained on said rod 7 by means of a flat headed screw 7ᶜ tapped into the outer end of rod 7. Trigger 8 is provided for the purpose of shifting the key 7ª longitudinally of the shaft 1 to lock collar member 5 to said shaft 1, or sleeve member 4 to said shaft 1, or both.

When trigger 8 is pushed towards the wind-shield, key 7ª is pushed along slot 1ª of shaft 1 until said key engages the slot 5ᵇ in the collar 5, thereby locking the collar 5 to said shaft 1, whereas the sleeve 4 will remain loose upon the shaft 1. If, however, the trigger 8 is pulled away from said wind-shield the key 7ª will become disengaged from slot 5ᵇ in collar 5, and will enter the slot 4ᵇ in sleeve 4, and will lock said sleeve 4 to shaft 1, at which time shaft 1 may be rotated or oscillated by means of hand crank 4ª, and collar 5 will then be disengaged from said shaft. Obviously, if key 7ª is engaged half with slot 5ᵇ of collar 5, and half with slot 4ᵇ of sleeve 4, the members 1, 4 and 5, will all be locked together and oscillate as a unit.

Between the end of shaft 1 and the trigger 8 is a metal washer 9, and one or more rubber washers 10, which washers 9 and 10 are enclosed in a cap 11, which cap abuts against trigger 8 and compresses the washer 10, whereby the latter will be caused to grip rod 7 and retain same in any adjusted position relative to the shaft 1.

The power means for imparting oscillatory motion to the shaft 1 comprises a rotatable shaft 12, which enters the casing 3, at right angles to, and in the horizontal plane of shaft 1, said shaft 12 being housed in suitable bearings 3ᵏ in said casing.

Upon the inner end of shaft 12 is a crank 12ª having a ball socket 12ᵇ on its outer end adapted to receive the ball end 13ª of a connecting rod 13, the opposite end of which rod 13 is loosely hinged to the outer end of arm 5ª of the collar 5, by means of a wrist pin 13ᵇ and between the rod 13 and crank arm 5ª may be placed a washer 13ᶜ.

Shaft 12 may be positively rotated by means of a flexible shaft S of any desired type, which shaft S is driven from any revolving part of the vehicle, such as a speedometer or taximeter shaft, crank shaft, or the like. Shaft 12, may if desired, be operated or driven by means of a mechanism separate and distinct from the vehicle itself, such as an electric motor, vacuum pump, or the like.

As above stated, shafts 1 and 12 lie in the same horizontal plane and are disposed at right angles to each other. The effective length of rod 13 may be varied to suit required conditions. Since the connection of rod 13 to crank 12ª is a ball and socket joint, and the connection of rod 13 to crank arm 5ª is a hinged connection, as shaft 12 is rotated, shaft 1 will be oscillated through an arc dependent upon the length of rod 13.

A suitable clutch mechanism may be interposed in the flexible shaft S, which clutch may be mounted either adjacent the casing 3, or may be mounted on the instrument board, or other part of the vehicle. My clutch preferably comprises a tubular member 15 adapted to be attached to one end of a split in the flexible shaft S in any desired manner. Member 15 has a rectangular slot 15ª therein adjacent one end into which extends the semi-circular portion 15ᵇ of a spring member 15ᶜ, which member 15ᶜ is disposed longitudinally of said member 15, and attached thereto by means of a pin 15ᵈ.

Extending within the open end of member 15 is a bolt 16, adapted to make a sliding fit within said member 15, and having a semi-circular longitudinally disposed recess 16ª, adapted to fit the semi-circular portion 15ᵇ of spring member 15ᶜ when bolt 16 is inserted in member 15, to lock said members together, thereby causing bolt 16 to rotate with member 15. The opposite end of bolt 16 is provided with a key 16ᵇ adapted to slide in a longitudinal groove 17ª in a cap member 17 to which the other end of the split in the flexible shaft S is attached, thus permitting bolt 16 to slide longitudinally of members 15 and 17, but bolt 16 remaining at all times keyed to cap member 17. A suitable ring 18 may be loosely mounted on bolt 16 for the purpose of shifting the bolt longitudinally of said members 15 and 17 to lock or unlock the bolt 16 from the member 15, as above described.

Any other type of clutch however may be used in flexible shaft S.

I do not limit my wind-shield wiper to the exact form shown in the drawings, for obviously minor changes could be made therein without departing from the scope of the invention.

I claim:

1. A wind-shield wiper, comprising a rock shaft movably mounted on the windshield; means for rocking said shaft; a wiper carrying arm on said shaft engaging the wind shield glass; and means for shifting said shaft to move said arm out of engagement with the glass at the end of each wiping stroke.

2. In a wind-shield wiper as set forth in claim 1, said means comprising a guide extending transversely of said shaft, and having symmetrically disposed portions on opposite sides and offset axially of said shaft; and a member connected with said shaft and engaging said guide.

3. In a wind-shield wiper as set forth in claim 1, said means comprising a pair of parallel guides extending transversely of and on opposite sides of said shaft, said guides having symmetrical portions on opposite sides and off-set axially of said shaft and equidistant from the axis thereof; and a member on said shaft engaging said guides.

4. A wind-shield wiper, comprising a casing; an oscillatory shaft extending through said casing and slidable therein; a wiper carrying arm on said shaft engaging the wind-shield glass; a guide in said casing extending transversely of said shaft, said guide having symmetrically disposed portions on both sides and offset axially of said shaft; and a pin on said shaft engaging said guide, whereby as said shaft is ocillated the arm will be shifted out of engagement with said glass at the end of each wiping stroke.

5. A wind-shield wiper, comprising an axially movable rock shaft extending transversely of said wind-shield; means for rocking said shaft; a wiper carrying arm on said shaft normally engaging the wind-shield glass; a pair of parallel guides extending transversely of and on opposite sides of said shaft and having symmetrical portions on opposite sides and offset axially of said shaft and equidistant from the axis thereof; a pin on said shaft engaging said guides, whereby as said shaft is rocked the pin will engage said offset portions and move the shaft axially to disengage the arm from the glass at the end of each wiping stroke.

6. In a wind-shield wiper, a casing adapted to be mounted on the wind-shield frame; a hollow rock shaft extending through said casing at right angles to said wind-shield, and having a longitudinal slot therein; a wiper carrying arm mounted on said shaft and engaging the wind-shield glass; a crank loosely mounted on said shaft within the casing and having a slot therein adapted to register with said slot in the shaft; a rotatable shaft entering said casing adjacent said crank; means connecting said crank and said second shaft whereby the rotatory motion of said second shaft will rock said first shaft, a key adapted to slide in said slots; and means for shifting said key to lock and unlock said crank and said first shaft.

7. In a wind-shield wiper, a rock shaft having a longitudinal slot therein; a wiper carrying arm on said shaft; a crank loosely mounted on said shaft; means for continuously rocking said crank; said crank having a longitudinal slot therein adapted to register with the slot in said shaft; a key adapted to slide in said slots; and means for shifting said key to lock or unlock said crank and shaft.

8. In a wind-shield wiper as set forth in claim 7, said rock shaft being hollow, and said means comprising a key rod carrying said key and extending into said hollow shaft; a trigger mounted on said rod; and means for binding the rod in adjusted position.

9. In a wind-shield wiper, as set forth in claim 7, said means comprising a key rod carrying said key and extending into said hollow shaft and having its outer end tapered; a correspondingly tapered trigger detachably mounted on the outer end of said rod; metallic and resilient washers on said rod interposed between the end of said shaft and said trigger, and a cap enclosing said washers and abutting against said trigger whereby the resilient washers will be compressed against said rod.

10. In a wind-shield wiper, a rock shaft having a longitudinal slot therein, a sleeve on said shaft having a longitudinal slot on its inner end adapted to register with the slot in said shaft; a handle on the outer end of said sleeve; a key adapted to slide in said slots; and means for shifting said key to lock or unlock said sleeve and shaft.

11. In a wind-shield wiper as set forth in claim 10, said rock shaft being hollow, and said means comprising a key rod carrying said key and extending into said hollow shaft; a trigger mounted on said rod; and means for binding the rod in adjusted position.

12. In a wind-shield wiper, as set forth in claim 10, said means comprising a key rod carrying said key and extending into said hollow shaft and having its outer end tapered; a correspondingly tapered trigger detachably mounted on the outer end of said rod; metallic and resilient washers mounted on said rod and interposed between the end of said shaft and said trigger, and a cap enclosing said washers and abutting against said trigger whereby the resilient washers will be compressed against said rod.

13. In a wind-shield wiper, a hollow rock shaft having a longitudinal slot therein; a sleeve rotatably mounted over the slotted portion of said shaft and having a longitudinal slot on its inner end adapted to register with the slot in said shaft; a handle on the outer end of said sleeve; a key adapted to slide in said slots; a key rod carrying the key on its inner end, and having its outer end tapered, said rod extending into the hollow rock shaft, a correspondingly tapered trigger detachably mounted on the outer end of said rod, and means for frictionally binding the rod in adjusted position.

14. In a wind-shield wiper as set forth in claim 13, said means comprising alternate metallic and resilient washers on said rod interposed between the end of said shaft and said trigger; and a cap enclosing said washers and abutting against said trigger, whereby the resilient washers will be compressed to grip said rod.

In testimony that I claim the foregoing as my own I affix my signature.

RUSSELL JAMES BROWNBACK.